United States Patent
Ogata et al.

(10) Patent No.: US 8,431,505 B2
(45) Date of Patent: Apr. 30, 2013

(54) ALUMINA SINTERED BODY AND METHOD FOR MANUFACTURING SAME, AND SPARK PLUG COMPRISING THE ALUMINA SINTERED BODY AS AN INSULATOR

(75) Inventors: Itsuhei Ogata, Okazaki (JP); Hirofumi Suzuki, Kuwana (JP); Hiroshi Araki, Oobu (JP); Yasuki Aoi, Gifu (JP)

(73) Assignees: Nippon Soken, Inc., Nishio (JP); Denso Corporation, Kariya (JP)

( * ) Notice: Subject to any disclaimer, the term of this patent is extended or adjusted under 35 U.S.C. 154(b) by 622 days.

(21) Appl. No.: 12/722,175

(22) Filed: Mar. 11, 2010

(65) Prior Publication Data
US 2010/0229813 A1    Sep. 16, 2010

(30) Foreign Application Priority Data

Mar. 11, 2009   (JP) ................. 2009-057612

(51) Int. Cl.
*C04B 35/111*    (2006.01)
*H01T 13/20*    (2006.01)

(52) U.S. Cl.
USPC ............ 501/128; 501/127; 313/118; 313/130

(58) Field of Classification Search .......... 501/127, 501/128; 313/118, 130
See application file for complete search history.

(56) References Cited

U.S. PATENT DOCUMENTS

| 6,265,816 B1 | 7/2001 | Ito et al. | |
| 2006/0186780 A1* | 8/2006 | Ogata et al. | 313/118 |

FOREIGN PATENT DOCUMENTS

| EP | 1 005 125 | 5/2000 |
| EP | 1005125 | * 5/2000 |
| JO | 2564842 | 10/1996 |
| JO | 11-195473 | 7/1999 |
| JP | 62-132765 | 6/1987 |
| JP | 63-190753 | 8/1988 |
| JP | 11-317279 | 11/1999 |
| JP | 2000-272958 | 10/2000 |
| JP | 2001-002466 | 1/2001 |

OTHER PUBLICATIONS

Japanese Office Action dated Jan. 24, 2012, issued in corresponding Japanese Application No. 2009-057612 with English Translation.

* cited by examiner

*Primary Examiner* — Karl Group
(74) *Attorney, Agent, or Firm* — Nixon & Vanderhye PC

(57) ABSTRACT

An alumina sintered body comprises alumina crystals as a main phase and a grain boundary phase made up of crystalline $Y_2Si_2O_7$ and amorphous $SiO_2$ at grain boundaries of the alumina crystals wherein when the alumina sintered body is taken as 100 wt %, the high melting phase is present in the range of from 0.1 wt % to 15 wt %. There is also provided a method for preparing the alumina sintered body, which method comprising a first mixing step P1 of mixing, at least, a yttria powder having an average particle size of 60 to 100 nm and a silica powder having a given average particle size to provide a mixed slurry and a second mixing step of further mixing an alumina powder having an average particle size of 0.5 to 1.0 μm in the mixed slurry.

4 Claims, 11 Drawing Sheets

_US 8,431,505 B2_

ALUMINA SINTERED BODY AND METHOD FOR MANUFACTURING SAME, AND SPARK PLUG COMPRISING THE ALUMINA SINTERED BODY AS AN INSULATOR

CROSS-REFERENCE TO RELATED APPLICATION

This application is based on and claims the benefit of priority from earlier Japanese Patent Application No. 2009-057612 filed on Mar. 11, 2009, the description of which is incorporated herein by reference.

BACKGROUND OF THE INVENTION

1. Field of the Invention

This invention relates to an alumina sintered body made primarily of alumina and a manufacture thereof, and also to a spark plug using the alumina sintered body as an insulator thereof.

2. Technical Background

Alumina ($Al_2O_3$) is a material that has chemically and physically stable properties. An alumina sintered body made chiefly of alumina has been in wide use as an insulating material and the like in the fields of spark plugs used for combustion engines of automobile, engine parts, and IC boards because of its good insulating nature and withstand voltage characteristic.

It is known that a difficulty is involved in obtaining a dense sintered body, made primarily of alumina of high purity, at a relatively low temperature of not higher than 1650° C. To cope with this, the sintered body has been densified at such a relatively low temperature as mentioned above by addition of a sintering aid, such as silica ($SiO_2$), magnesia (MgO), calcia (CaO) and/or the like, which is capable of forming a low melting liquid phase through eutectic reaction with alumina (see, for example, Japanese Laid-open Patent Application Nos. Sho 63-190753 and Hei 11-317279). The alumina sintered body obtained in this way is very stable thermally and chemically, high in mechanical strength and excellent in electric insulation. Thus, this sintered body has been widely put into practice as an electric insulator such as of spark plugs for combustion engines and the like.

On the other hand, internal combustion engines employed such as in automobiles have been advanced in respect of the power rating and miniaturization thereof. In association with an increasing valve occupying area in the combustion chamber, a demand for further miniaturization of spark plug is increasing. This entails a tendency toward thinning of an insulator interposed between a central electrode and a metal fitting serving as a ground electrode in the spark plug. Supercharging with a supercharger such as a turbo charger or the like is now in progress, with the tendency that a temperature within the combustion chamber increases. This in turn requires a high breakdown or withstand voltage, high heat resistance and high strengthening with respect to alumina sintered bodies used as an insulating material for spark plugs.

With existing alumina sintered bodies containing $SiO_2$—MgO—CaO sintering aids illustrated as being conventional in Japanese Laid-open Patent Application No. Sho 63-190753, however, there exists or remains, as a low melting amorphous phase, the sintering aid in crystal grain boundaries of alumina. Such a low melting amorphous phase is so low in band gap that limitation is placed to achieve a high withstand voltage of the resulting alumina sintered body. In addition, the low melting amorphous phase is low in mechanical strength and places limitation on the high strengthening. Alumina has a high melting point (of about 2050° C.) and if the content of alumina in an alumina sintered body increases, a high withstand voltage and a high heat resistance can be expected. Nevertheless, a high content of alumina leads to poorer sinterability. This makes it difficult to provide a densely sintered product at a practical sintering temperature ranging from 1400° C. to 1600° C., thereby impeding to obtain a highly strengthened and high withstand voltage product.

Under these circumstance, Japanese Laid-open Patent Application No. Sho 63-190753 has realized an alumina ceramic having a porosity of not higher than 6% and a withstand voltage of 30 to 35 kV/mm and also a spark plug using this alumina ceramic as an insulator. In this application, there are used an alumina powder having an average particle size of not larger than 1 μm and a novel type of sintering aid made of at least one of yttria, magnesia, zirconia and lanthanum oxide employed in place of a conventional $SiO_2$—MgO—CaO sintering aid thereby inhibiting abnormal grain growth of alumina by formation of a high melting grain boundary phase in the alumina grain boundaries.

In the Japanese Laid-open Patent Application No. Hei 11-317279, there has been proposed an alumina insulator having a high withstand voltage, which comprises from larger than 95 wt % to 99.7 wt % of alumina and from 0.3 to 5 wt % of a sintering aid. The sintering aid contains B component in an amount of from 0.01 to 0.25 wt %, converted as $B_2O_3$, so that alumina-based main phase grains having a grain size of not smaller than 20 μm are made at not less than 50% of the sectional area thereby making the number of pores having a size of not smaller than 10 μm at 100 or below per $mm^2$.

In an example set out in this patent application, in spite of the fact that a penetrating insulation breakdown voltage in oil of a test piece shaped in a given size is a relatively high value of 38 kV and a spark plug is formed by use of a sintering aid containing a given ratio of boron and alumina, a withstand voltage test using an actual device reveals that spark penetration occurs in 40 to 50 hours after continuous operations at a discharge voltage of 35 kV.

This is considered for the following reason. When such a sintered body as set forth in the above-mentioned Japanese Laid-open Patent Application No. Hei 11-317279, in which alumina particles are grown into grains having a size as great as 20 μm or over in the course of sintering, is provided as a test piece of a simple form, the piece becomes high in green sheet density because of the relative ease in molding, thus resulting in a high sintered density to obtain a high withstand voltage. Nevertheless, if a configuration becomes relatively complicated as with the case of an actual spark plug, air existing in a molded body is not discharged along with the progress of sintering and thus, a number of pores are left in alumina particles having underwent a great degree of grain growth.

In fact, in examples of the Japanese Laid-open Patent Application No. Hei 11-317279 wherein the withstand voltage in an actual machine test becomes low, although it is not known exactly how many pores exist in an insulator of a spark plug, 91 or 92 pores having such a very great size of not smaller than 10 μm are observed per unit area of test pieces. Such pores existing inside the insulator may become a starting point for insulation breakdown when a high voltage is applied thereto.

Hence, it is considered that a difficulty is involved in completely removing pores inside the sintered body when using such a known procedure as set forth in the Japanese Laid-open Patent Application No. Hei 11-317279. If a test piece of a simple form exhibits a high withstand voltage, there is concern that withstand voltage may vary by the influence of the amount of pores left inside the sintered body although depending on the shape of product in case where an actual product is made by use of such a material that is difficult in removing the pores. This may impede the reliability as a spark plug.

In the sintering step of an alumina sintered body, where sintering is advanced while inhibiting grain growth as in the Japanese Laid-open Patent Application No. Sho 63-190753, open pores existing inbetween alumina particles move along with grain boundaries as the sintering proceeds and finally disappear. Nevertheless, although depending on the type and amount of sintering aid and the manner of addition, where a grain growth rate is higher than a moving rate of the pores under unsatisfactory conditions of suppressing the grain growth rate, there is concern that pores remain inside the grown alumina particles. Closed pores which have been once taken in the inside of the alumina particles do not disappear no matter how much it is heated subsequently and are left as defectives in the inside of the sintered body.

If a sintering aid is added in excess or if a sintering aid being added is locally distributed depending on the manner of addition, there is also concern that pores may remain because of insufficient sintering. Accordingly, in the alumina sintered body wherein a sintering aid that is able to inhibit grain growth of alumina is added as in the Japanese Laid-open Patent Application No. Sho 63-190753, there is some room for realizing a further high withstand voltage and high-strengthening by reducing defectives in number through improvement of a sintered density by optimizing the type of sintering aid to be used, mixing ratio and manner of mixing so as to improve densification of a sintered body while inhibiting the grain growth of alumina to promote elimination of the pores.

SUMMARY OF THE INVENTION

It is accordingly an object of the invention to provide a novel type of alumina sintered body that exhibits excellent withstand voltage characteristics and is high in strength and heat resistance and also to a method for making the same.

It is another object of the invention to provide a spark plug making use of the alumina sintered body as an insulator.

In order to attain the above objects, we made intensive studies on the particle size of alumina powder and the types of sintering aid powders, the mixing ratios and the manner of mixing so as to obtain an alumina sintered body of a desired type.

Hence, according to one aspect of the invention, there is provided an alumina sintered body which has alumina crystals as a main phase and a grain boundary phase containing at least a yttrium component in grain boundaries of the alumina crystals, wherein the alumina crystals have an average crystal size of not larger than 2 μm, the grain boundary phase has a high melting phase comprised of $Y_2Si_2O_7$ as the yttrium component and $SiO_2$, and when the alumina sintered body is taken as 100 wt %, the high melting phase is present in the range of from 0.1 wt % to 15 wt %.

It has been found that the alumina sintered body as defined above includes a high melting phase existing in crystal grain boundaries. This high melting phase has a band gap higher than a low melting amorphous phase formed of an existing sintering aid of a $SiO_2$—CaO—MgO ternary system and makes insulation breakdown difficult. In addition, the alumina sintered body becomes high in withstand voltage. It has been confirmed that the crystal grain boundaries serve to inhibit abnormal grain growth of the alumina crystal grains in the sintered body during the course of sintering and promote elimination of pores, thereby providing an alumina sintered body that is dense and high in strength. The alumina sintered body according to the invention has a withstand voltage of not smaller than 35 kV/mm and a four-point bending strength of not smaller than 430 MPa at both room temperature and a high temperature of 900° C. when determined by a test method described in JIS R1601.

The crystal grain boundaries may further comprise a mullite ($Al_6Si_2O_{13}$) phase. When this mullite phase exists, similar effects as attained by the above embodiment can be achieved using a smaller content of Y.

Further, it is preferred that Y existing in the crystal grain boundaries ranges from 0.02 wt % to 0.08 wt %, converted to $Y_2O_3$, when Si existing in the grain boundaries is taken as unit weight as converted to $SiO_2$.

We have found that when Y and Si exist in the crystal grain boundaries within ranges of the contents thereof, better effects are obtained. The content of yttrium in the grain boundaries can be smaller than with the case of the prior-art alumina sintered body containing yttrium in crystal grain boundaries.

According to another aspect of the invention, there is provided a method for manufacturing an alumina sintered body having alumina crystals as a main phase and a crystal grain boundary phase containing at least yttrium at crystal grain boundaries of the alumina crystals, the method comprising:

a first mixing step wherein at least a yttria powder having an average particle size of from 50 nm to 100 nm and a silica powder having an average particle size of from 0.5 μm to 1.0 μm are mixed at a ratio by weight of 0.02 to 0.08:1 and dispersing the resulting mixture in a dispersion medium to provide a slurry of the yttria and silica mixture;

a second mixing step wherein an alumina powder having an average particle size of 0.4 μm to 1.0 μm is formulated in the slurry of the yttria and silica mixture obtained in the first mixing step in such a way that a total of the yttria powder and the silica powder is in the range of from 0.1 part by weight to 15 parts by weight per 100 parts by weight of a total of the alumina powder, yttria powder and silica powder to obtain a yttria/silica/alumina mixed slurry;

a granulation step wherein the yttria/silica/alumina mixed slurry obtained in the second mixing step is sprayed and dried to obtain a yttria/silica/alumina mixed powder:

a molding step wherein the yttria/silica/alumina mixed powder obtained in the granulation step is molded in a desired form; and a sintering step wherein the molding of the yttria/silica/alumina mixed powder is sintered at a temperature of 1300° C. to 1600° C. to obtain an alumina sintered body.

In the first mixing step of this embodiment, the yttria powder and silica powder are uniformly mixed. In the second mixing step, the yttria powder, silica powder and alumina powder are so mixed that the yttria powder is not locally distributed particularly with respect to the alumina powder to establish a much stabilized mixed condition. When the resulting stable mixed dispersion is powdered, molded and sintered, crystalline $Y_2Si_2O_7$ and amorphous $SiO_2$ can be uniformly distributed at the alumina crystal grain boundaries without permitting Y to be locally distributed relative to the alumina crystals. It has been found that the alumina sintered body obtained in this way includes alumina crystals whose average particle size is not larger than 2 μm, is dense with a reduced number of pores therein, and has a withstand voltage of not smaller than 35 kV/mm and a four-point bending strength of not smaller than 400 MPa when measured at 900° C. according to the method described in JIS-R1601.

It is preferred that in the first mixing step, a mullite powder having an average particle size of from 0.5 μm to 1.0 μm is further added in an amount substantially equal to that of the silica powder. It has been found that the addition of the mullite powder allows such effects as in the above embodiment to be obtained if yttria is used in smaller amounts. If an existing sintering aid such as $SiO_2$—MgO—CaO or the like is used and an Al component and an Si component both exist in crystal grains of a sintered body, a mullite phase may be formed through a solid phase reaction. In this connection, however, when such a mullite powder is added as in the present invention, it is assumed that such a preliminarily added mullite powder forms nuclei. Consequently the activation energy of the solid phase reaction becomes so low that it is more likely to form an $Al_6Si_2O_{13}$ phase at the alumina crystal grain boundaries, thereby more promoting densification.

According to a further aspect of the invention, there is provided a spark plug mounted in an combustion engine, which comprises a metal fitting having a screw thread at an outer periphery thereof, an insulator fixed inside the metal fitting, a central electrode fixed in the insulator so as to permit a tip end thereof to project from the insulator, and a ground electrode fixed to the metal fitting and being in face-to-face relation with the tip end of the central electrode through a spark gap, wherein the insulator is made of the alumina sintered body defined above.

According to the invention, if the screw thread required for the spark plug of supercharger mixed compression ignition combustion engines or combustion engines that have a great valve area and a small space of mounting the spark plug therein is so fine as to have a nominal diameter of not larger than 10 mm, there can be realized a reliable spark plug having a high withstand voltage and high strength.

BRIEF DESCRIPTION OF THE DRAWINGS

FIGS. 10A and 10B are, respectively, a withstand voltage of the alumina sintered body of the first embodiment of the invention wherein FIG. 10A shows a withstand voltage relative to a change in concentration of a sintering aid and FIG. 10B shows a withstand voltage relative to a change in concentration of Y component in the sintering aid converted as $Y_2O_3$ by wt %;

FIGS. 12A and 12B are, respectively, a withstand voltage of the alumina sintered body of the second embodiment of the invention wherein FIG. 11A shows a withstand voltage relative to a change in concentration of a sintering aid and FIG. 11B shows a withstand voltage relative to a change in concentration of Y component in the sintering aid converted as $Y_2O_3$ by wt %;

BEST MODE FOR CARRYING OUT THE INVENTION

According to a first embodiment of the invention, there is provided an alumina sintered body, which comprises alumina crystals having an average crystal particle size of not larger than 2 μm as a main phase and wherein when the alumina sintered body is taken as 100 wt %, a high melting phase made of crystalline $Y_2Si_2O_7$ and amorphous $SiO_2$ is formed in an amount of from 0.1 wt % to 15 wt % at grain boundaries of the alumina crystals.

Figure 1:
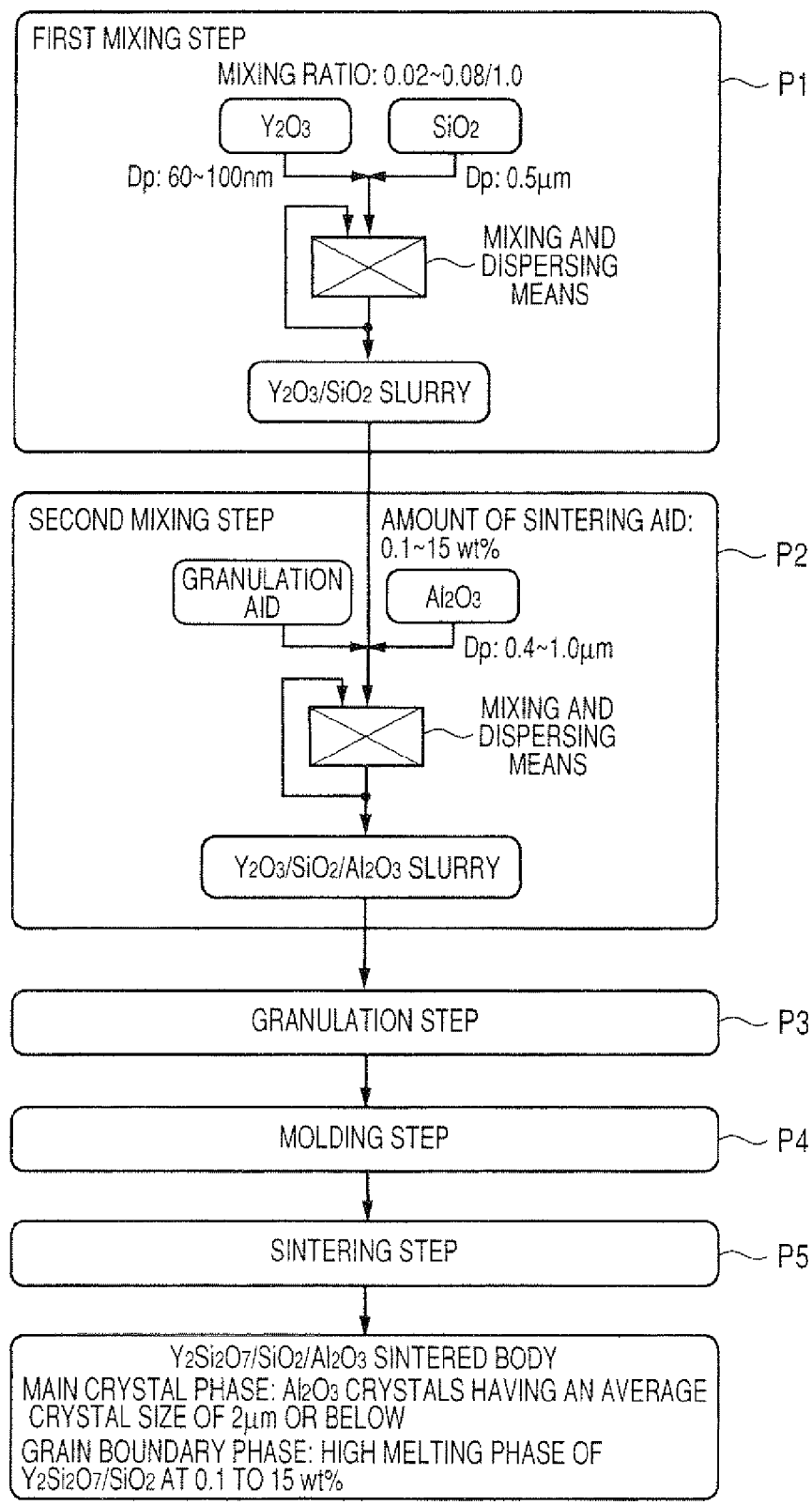
FIG. 1 is a flow chart schematically showing a process of manufacturing an alumina sintered body according to a first embodiment of the invention.

Referring now to FIG. 1, a procedure of manufacturing an alumina sintered body according to this embodiment of the invention is generally illustrated.

In a first mixing step P1, silica powder and yttria powder are dispersed in water at a predetermined ratio to form a yttria/silica mixed slurry.

More particularly, a silica powder having a $SiO_2$ purity of not less than 99.9% and an average particle size of 0.5 μm to 1.0 μm and a yttria powder having a $Y_2O_2$ purity of not less than 99.9% and an average particle size of 60 to 100 nm are provided. The yttria powder and silica powder are formulated at a ratio by weight of 0.02 to 0.08:1.0. For example, 20 to 70 parts by weight of a mixture of the yttria powder and silica powder is added to 100 parts by weight of pure water and charged into a tank equipped with an agitation blade, followed by mixing under agitation. As a matter of course, dispersants may be appropriately added to the mixture, if necessary. Such dispersants may be any of ordinarily employed ones and may be used in an amount of 0.5 to 5 parts by weight of the mixture.

Further, using a mixing and dispersing means such as a high-speed rotary mixer or the like, the yttria powder and silica powder are uniformly dispersed to provide a yttria/silica mixed slurry. The high-speed rotary mixer has usually a mixing chamber and a plurality of rotors that are able to rotate in the chamber at a peripheral speed of about 20 m/second.

When the yttria and silica powder mixed slurry is introduced into the mixing chamber wherein the plural rotors are rotated at a high speed, a high-speed swirl flow is formed in the mixed slurry. The respective rotors are designed, for example, to have about 1 mm wide slits. When the mixed slurry passes through the slits, shock waves develop whereupon the aggregates of the silica and yttria powders are disintegrated to allow uniform dispersion. As a result, there can be obtained a yttria/silica mixed slurry wherein the yttria and silica powders are dispersed uniformly. A more uniform slurry can be obtained when passed through the high-speed rotary mixer plural times.

For instance, the pass operation through the high-speed rotary mixer is repeated three times. It will be noted that one pass operation used herein means one passage of a total amount of a starting mixture slurry through the mixing chamber of the high-speed rotary mixture and three pass operations mean three passages of the slurry.

In a second mixing step P2, the yttria/silica mixed slurry obtained in the first mixing step and an alumina powder are mixed at a predetermined ratio and further mixed under agitation, to which a granulation aid is added in an appropriate amount thereby forming a yttria/silica/alumina mixed slurry. The alumina powder used is, for example, one having an $Al_2O_3$ purity of not less than 99.9% and an average particle size of from 0.4 to 1.0 µm.

The mixing ratio between the yttria/silica slurry and the alumina powder is such that when expressed as a weight ratio in powder state, the yttria/silica mixed sintering aid ranges from 0.1 wt % to 5 wt % with the balance of the alumina powder.

The granulation aid (i.e. a kind of binder) includes, for example water-soluble resin materials such as polyvinyl alcohol, acrylic resin and the like.

In a granulation step P3, the yttria/silica/alumina mixed slurry obtained in the second mixing step P2 is granulated according to a known granulation method using, for example, a spray drying apparatus and dried to obtain a yttria/silica/alumina granulated powder.

In a molding step P4, the yttria/silica/alumina powder obtained in the granulation step P3 is subjected to any of known molding methods such as cold isostatic pressing (CIP), uniaxial pressing, multiaxial pressing and the like, thereby obtaining a yttria/silica/alumina molded body of a given shape.

In a sintering step P5, the yttria/silica/alumina molding obtained in the molding step 4 is sintered within a temperature range of from 1400° C. to 1600° C. in air, for example, for 1 to 3 hours by use of any of known sintering furnaces to obtain an alumina sintered body of the invention. It will be noted that in this step, the granulation aid in the molded body is appropriately removed during the course of the sintering step or through a binder-removing treatment using a dewaxing furnace.

The alumina sintered body of the invention has $Al_2O_3$ crystals having an average particle size of not larger than 2 µm as a main crystal phase and a high melting phase made of from 0.1 wt % to 15 wt %, in total, of crystalline $Y_2Si_2O_7$ and amorphous $SiO_2$ and existing as a grain boundary phase. The existence of Y allows abnormal grain growth of $Al_2O_3$ to be inhibited and ensures formation of a dense sintered body having a reduced number of pores. The high melting phase made of $Y_2Si_2O_7$ and $SiO_2$ existing in the crystal grain boundaries can be expected to bring about a wide band gap and a high withstand voltage. It has been found that the alumina sintered body obtained in this way has a density of 3.95 g/cm$^3$ (with a relative density of 98.5%). Moreover, it has been experimentally confirmed that when such a sintered body is subjected to X-ray diffraction analysis, the amounts of Al, Si and Y contained in the alumina sintered body substantially correspond to the formulation ratios of $Al_2O_3$, $SiO_2$ and $Y_2O_3$ used as the starting materials, respectively.

Reference is now made to FIG. 2 and FIGS. 3A to 3C so as to describe in detail how the silica powder and yttria powder used in the first mixing step are dispersed.

Figure 2:
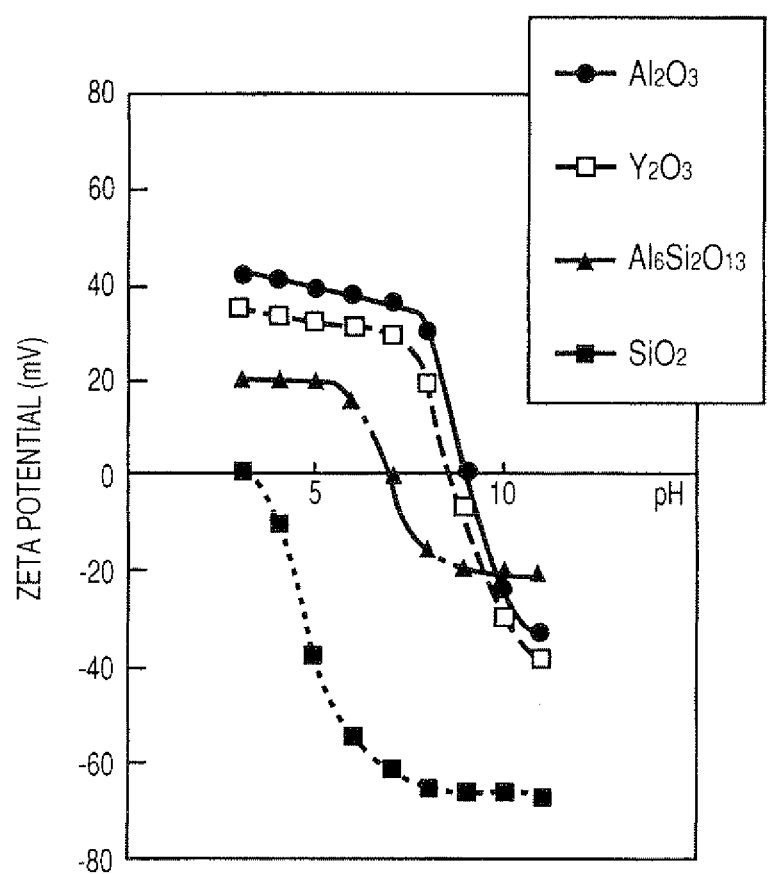
FIG. 2 is a graph showing the relation between the zeta potential of each of powder materials used for an alumina sintered body of the invention and the pH of a dispersion medium.

When ceramic powders such as silica powder, yttria powder and alumina powder are dispersed in a polar dispersion medium such as water, the zeta potential changes depending on the pH of the dispersion medium as is particularly shown in FIG. 2. With a silica powder whose isoelectric point (iep) is within a pH range of 1 to 3 and with a yttria powder whose isoelectric point is within a pH range of 9 to 14, they, respectively, assume opposite surface charges within a wide pH range of from 3 to 9.

Figure 3A:
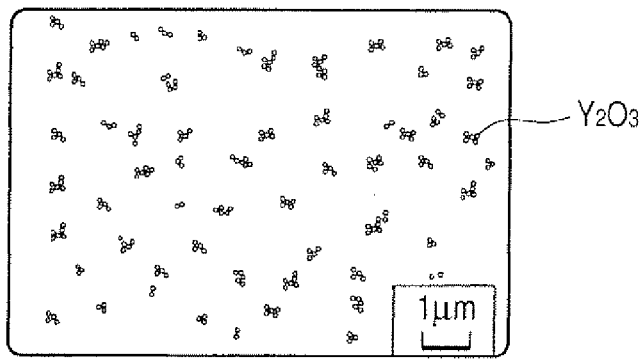
FIGS. 3A to 3C are, respectively, illustrative views showing, in a first mixing step, starting sintering aid materials used in an alumina sintered body of the invention wherein FIG. 3A schematically shows a yttria powder, FIG. 3B schematically shows a silica powder and FIG. 3C schematically shows a silica/yttria aggregate in a heteroaggregation region.
Figure 3B:
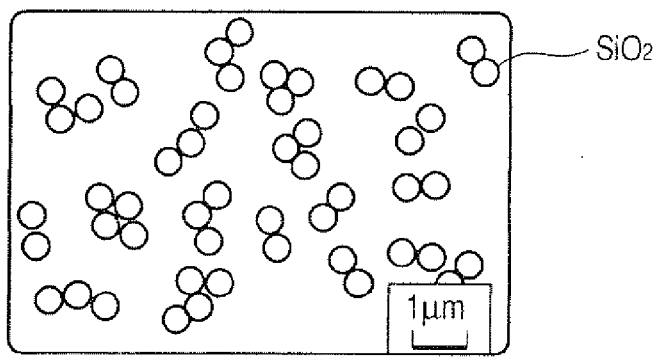
Figure 3C:
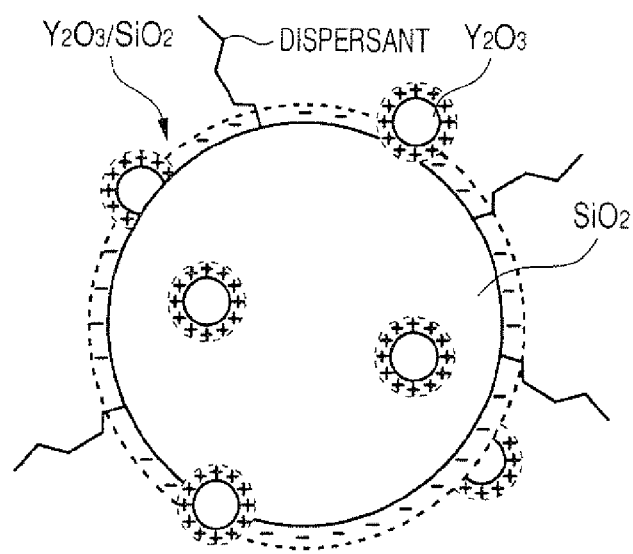

Since the yttria and silica powders used in the invention are very fine, they, respectively, form aggregates of a plurality of particles when used singly as is shown in FIGS. 3A and 3B. If a yttria powder having such strong agglomerating properties as mentioned above is directly mixed with an alumina powder in small amounts for use as a sintering aid, the aggregated particles cannot be disintegrated with concern that an inhomogeneous distribution is created.

In this connection, however, when yttria powder and silica powder are preliminarily dispersed in the first mixing step as in the present invention, the positively charged yttria particles are considered to be attached to the surface of the negatively charged silica particles to form heteroaggregation particles. Yttria particles or silica particles that individually assume the same charge are repulsed from one another by the action of electrostatic repulsion. Hence, it is considered that yttria powder and silica powder provide a stable dispersion in the form of a yttria/silica mixed slurry.

In the practice of the invention, the $SiO_2$ powder having an average particle size of from 0.5 to 1.0 µm is mixed with the $Y_2O_3$ powder having an average particle size of from 60 to 100 nm at a ratio by weight of 1:0.02 to 0.08. This range of the weight ratio allows several to several tens of yttria particles to be attached to or deposited on the surface of one silica particle thereby forming heteroaggregation particles.

In the second mixing step, the yttria particles move integrally with the silica particles wherein several to several tens of yttria particles are electrostatically adsorbed on the surface of each silica particle. In this condition, when alumina particles having a particle size similar to that of the silica particles are further mixed, the yttria particles alone are considered to be uniformly dispersed relative to the alumina particles without eccentric location. Moreover, the attachment of the yttria particles to individual silica particles contributes to neutralization of the surface charge of the resulting heteroaggregation particles, thereby permitting the surface charge to come close to the surface charge of the alumina particles. Accordingly, when compared with the case where silica particles alone are mixed with alumina particles, heteroaggregation is more unlikely to occur between silica and alumina particles. Thus, it is assumed that a slurry in a more stably dispersed condition can be formed.

The crystal structure of the alumina sintered body of the invention obtained in a manner as stated above are illustrated with reference to FIGS. 4A, 4B, 5 to 8.

Figure 4A:
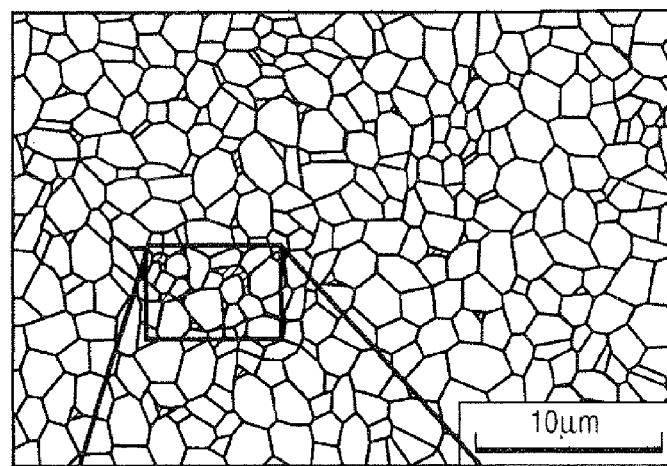
FIGS. 4A and 4B are, respectively, illustrative views showing a sintered state of an alumina sintered body of the invention wherein FIG. 4A schematically shows a microstructure of the sintered body and FIG. 4B schematically shows the detail of the crystal grain boundaries.
Figure 4B:
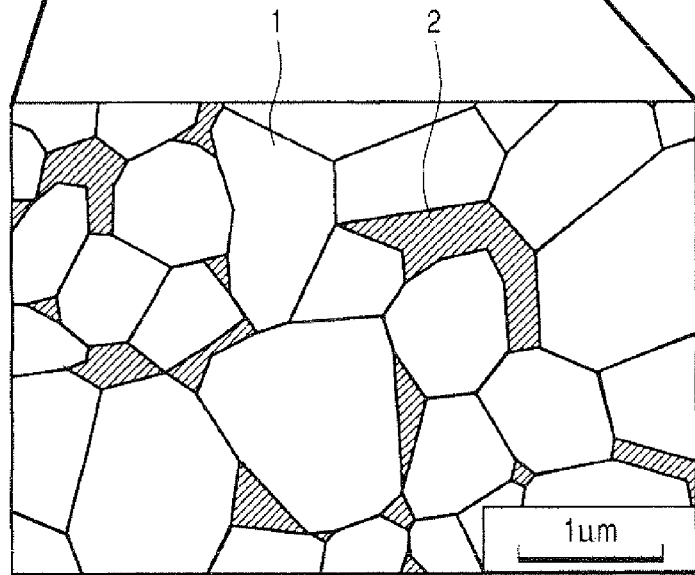
Figure 5:
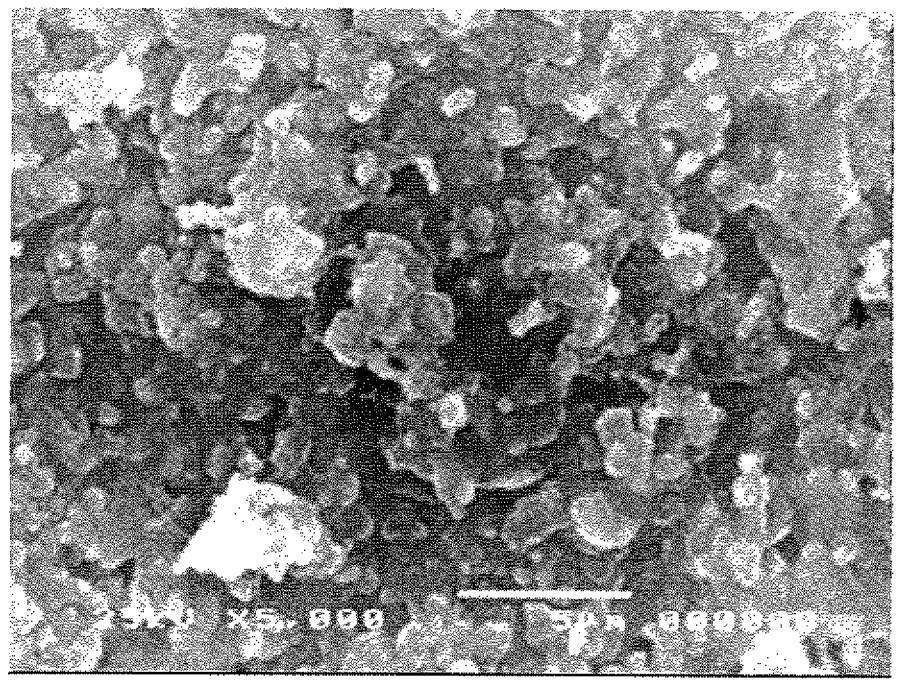
FIG. 5 is an electron micrograph showing a crystal structure of an alumina sintered body of the invention.
Figure 6:
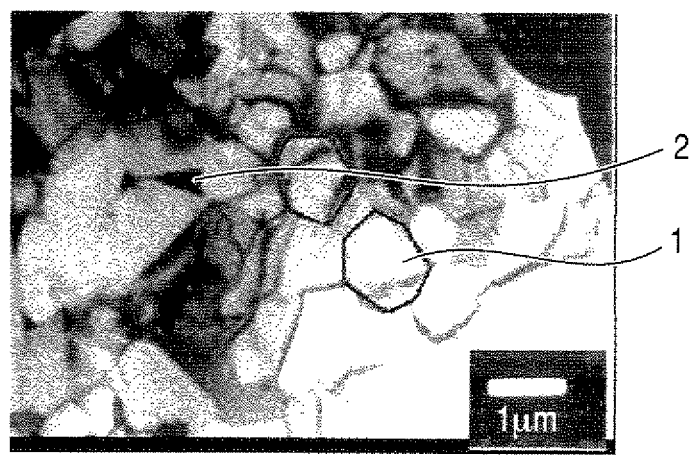
FIG. 6 is a transmission electron micrograph showing a crystal structure of an alumina sintered body of the invention.
Figure 7:
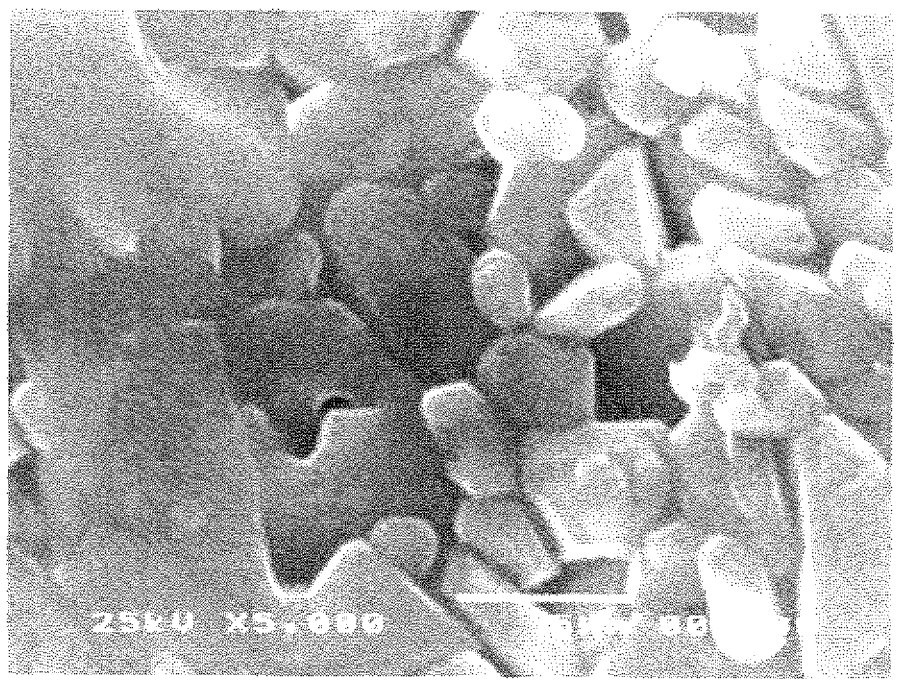
FIG. 7 is an electron micrograph showing a crystal structure of a conventional alumina sintered body for comparison.

FIG. 4A schematically shows the crystal structure of the alumina sintered body observed at low magnification power and FIG. 4B likewise shows the crystal structure of the alumina sintered body observed at higher magnification power. FIG. 5 is an actual SEM photograph (by 5000) for observing the free surface of the alumina sintered body. FIG. 6 is a TEM photograph of the sintered body of the invention. FIG. 7 is a SEM photograph for observing the free surface of a conventional alumina sintered body for comparison and FIG. 8 is a TEM photograph showing the crystal structure of the conventional alumina sintered body.

As is particularly shown in FIG. 4A, with the alumina sintered body of the invention, the average size of alumina crystals serving as a main crystal phase is at not greater than 2 μm and little observable pores are found as is particularly shown in FIG. 5.

As shown in FIG. 4B and FIG. 6, it has been confirmed that a crystal grain boundary phase 2 made of crystalline $Y_2Si_2O_7$ and amorphous $SiO_2$ exists in the crystal grain boundary so as to cover the periphery of the alumina particle.

Figure 8:
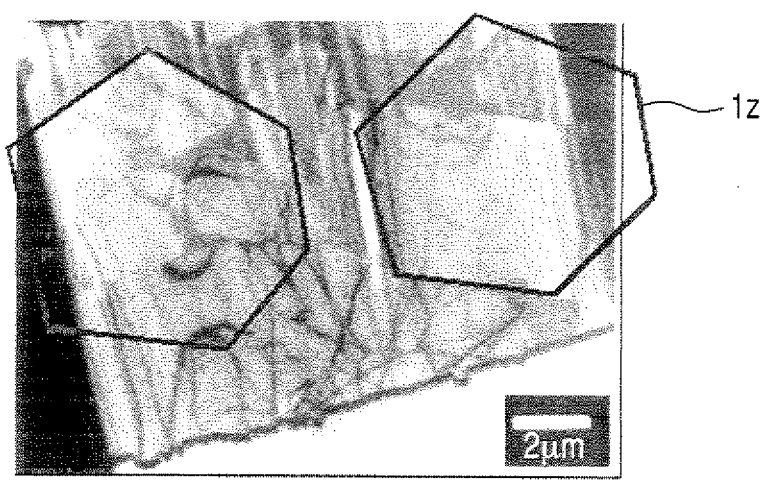
FIG. 8 is a transmission electron micrograph showing a crystal structure of a conventional alumina sintered body for comparison.

On the other hand, with a conventional alumina sintered body, it will be seen from FIGS. 7 and 8 that the average crystal size of alumina crystals 1z is so great as 6 μm and thus, grain grown occurs. In addition, a low-melting amorphous phase of a $SiO_2$—CaO—MgO three component system exists at the crystal grain boundary. This low-melting amorphous phase is low in mechanical strength and has limitation on high strengthening.

The alumina sintered body according to a second and preferred embodiment of the invention is described. This body comprises alumina particles having an average crystal size of not larger than 2 μm, and a high melting phase made of $Y_2Si_2O_7$, amorphous $SiO_2$ and crystalline $Al_6Si_2O_{13}$ existing at grain boundaries of the alumina crystals wherein when the alumina sintered body is taken as 100 wt %, the high melting phase is in the rang of from 0.1 wt % to 15 wt %.

Figure 9:
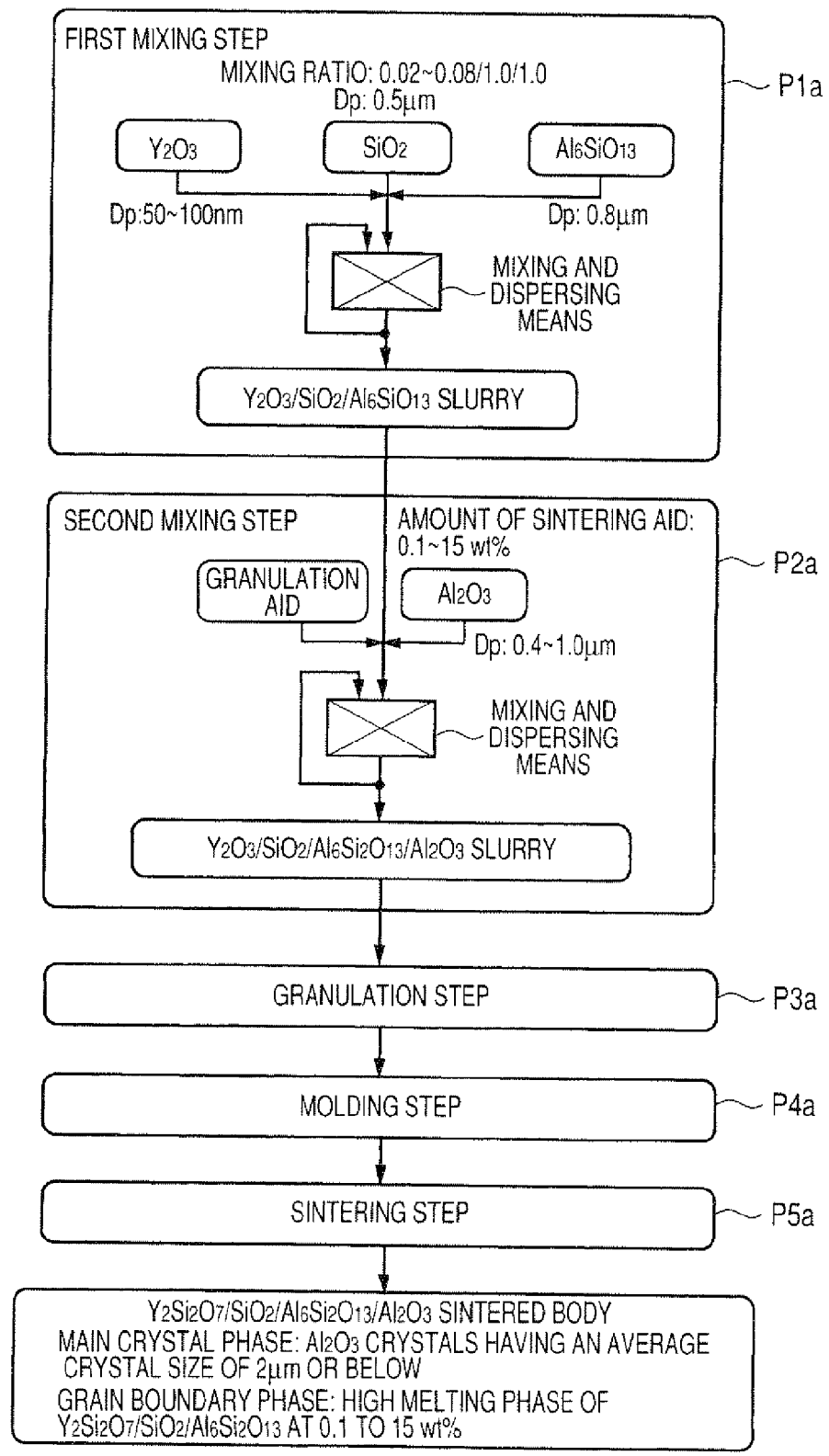
FIG. 9 is a flow chart schematically showing a process of manufacturing an alumina sintered body in accordance with a second embodiment of the invention.

Referring now to FIG. 9, the method of making such an alumina sintered body as stated above as the preferred embodiment.

In this embodiment, in a first mixing step, silica powder, yttria powder and mullite powder are dispersed in water at predetermined mixing ratios to provide a yttria/silica/mullite slurry.

More particularly, a $SiO_2$ powder having a purity of not less than 99.9% and an average particle size of from 0.5 to 1 μm, a $Y_2O_3$ powder having a purity of 99.9% and an average particle size of 60 to 100 nm and an $Al_6Si_2O_{13}$ powder having a purity of not less than 99.9% and an average particle size of 0.02 to 1 μm are used in place of the silica and yttria powders in the foregoing embodiment set out with reference to FIG. 1. In this case, the yttria powder and the silica powder are formulated at a ratio by weight of 0.02 to 0.08:1.0, and the mullite powder may be formulated in amounts equal to that of the silica powder.

The second mixing step P2a, granulation step P3a, molding step P4a and sintering step P5a are similar to those of FIG. 1, through which there can be obtained an alumina sintered body of this embodiment.

It has been experimentally confirmed that the crystal structure of the alumina sintered body of this embodiment comprises, as main crystals, alumina crystals having an average crystal size of not greater than 2 μm, and a high melting phase made of crystalline $Y_2Si_2O_7$, amorphous $SiO_2$ and crystalline $Al_6Si_2O_{13}$ formed at grain boundaries of the alumina crystals.

The invention is more particularly illustrated by way of examples, and comparative examples are also described.

EXAMPLE 1

An alumina powder having a purity of not less than 99.9% and an average particle size of from 0.4 to 1.0 μm, a silica powder having a purity of not less than 99.9% and an average particle size of 0.5 μm and a yttria powder having a purity of not less than 99.9% and an average particle size of from 60 to 100 nm were provided. It will be noted that the average particle size of the yttria powder was an average particle diameter obtained by arithmetic mean of 100 particles observed through a transmission electron microscope (TEM) and the maximum diameter of the particles was found to be at smaller than 1 μm.

In Table 1, the formulation ratios of alumina and a sintering aid of sample Nos. 1 to 11 are shown. In sample Nos. 1 to 11, the yttria powder and silica powder were mixed at a mixing ratio by weight of 0.02:1 in a first mixing step P1 as set forth with reference to FIG. 1 to provide a yttria/silica mixed slurry. Next, the alumina powder was further mixed with the mixed slurry at mixing ratios by weight between the alumina powder and the sintering aid powder as shown in Table 1 in a second mixing step P2 shown in FIG. 1 to obtain yttria/silica/alumina mixed slurries. Each slurry was subjected to such granulation step P3, molding step P4 and sintering step P5 as shown to obtain an insulator for actual spark plug. At this stage, it was experimentally confirmed that the insulator had a grain boundary phase made of $Y_2Si_2O_7$ and $SiO_2$.

Subsequently, a sample having a size of 15 mmφ and 1.0 mm in thickness was cut off from the thus obtained insulator for measurement of withstand voltage, followed by measurement of a withstand voltage according to a method described in JIS-C2141. The results are also shown in Table 1. More particularly, the sample of the alumina sintered body was polished to a thickness of 1.0±0.05 mm by use of a diamond abrasive lap and actually measured by means of a special withstand voltage measuring device. That is, a needle-shaped probe was put on opposite sides of the sintered body sample, under which a high voltage generated from a constant-voltage power supply through an oscillator and a coil was applied between the upper and lower probes in such a way that an applied voltage was raised in a stepwise manner at a rate of 1 kV/10 seconds from 20 kV while monitoring with an oscilloscope. A voltage at which the sample suffered insulation breakdown was determined as a withstand voltage of the alumina sintered body. Those samples exhibiting withstand voltages of not less than 35 kV/mm were exemplified as the bodies of Examples 1 to 6 of the invention, and those samples whose withstand voltage was lower than 35 kV/mm were outside the scope of the invention and exemplified as Comparative Examples X1 to X5.

In Table 1 shown below, those samples exhibiting a withstand voltage of not less than 40 kV/mm are evaluated as "excellent", those exhibiting a withstand voltage of not less than 35 kV/mm are as "good", those exhibiting a reduced effect although improved in withstand voltage are as "moderate" and those exhibiting results similar to the case using a conventional three-component sintering aid are as "poor".

TABLE 1

| | | Formulation ratio | | Withstand | | | |
|---|---|---|---|---|---|---|---|
| | Sample No. | Alumina (wt %) | Sintering aid (wt %) | voltage (kV/mm) | Evaluation | Sintering aid | Grain boundary phase composition |
| 1 | Reference X1 | 70 | 30 | 27 | Poor | $Y_2O_3/SiO_2$ = 0.02/1 | $Y_2Si_2O_7$ + $SiO_2$ |
| 2 | Reference X2 | 80 | 20 | 31 | Moderate | | |
| 3 | Example 1 | 90 | 10 | 36 | Good | | |
| 4 | Example 2 | 95 | 5 | 39 | Good | | |
| 5 | Example 3 | 98 | 2 | 42 | Excellent | | |

TABLE 1-continued

| Sample No. | Alumina (wt %) | Sintering aid (wt %) | Withstand voltage (kV/mm) | Evaluation | Sintering aid | Grain boundary phase composition |
|---|---|---|---|---|---|---|
| 6 Example 4 | 99 | 1 | 42 | Excellent | | |
| 7 Example 5 | 99.5 | 0.5 | 41 | Excellent | | |
| 8 Example 6 | 99.8 | 0.2 | 37 | Good | | |
| 9 Reference X3 | 99.9 | 0.1 | 33 | Moderate | | |
| 10 Reference X4 | 99.95 | 0.05 | 30 | Moderate | | |
| 11 Reference X5 | 99.98 | 0.02 | 25 | Poor | | |

Likewise, with sample Nos. 12 to 22 indicated in Table 2, the yttria powder and the silica powder were formulated at a mixing ratio of 0.04:1 and mixed in the first mixing step P1 to provide a yttria/silica mixed slurry. The alumina powder and the resulting sintering aid mixed powder in the form of the slurry were mixed at such mixing ratios of the alumina powder and the mixed powder indicated in Table 2 and mixed in the second mixing step P2 to prepare a yttria/silica/alumina mixed slurry. The thus obtained slurry was subjected to the granulation step P3, molding step P4 and sintering step P5 in the same way as set out above to obtain an insulator for actual spark plug. A sample having a size of 15 mm$\phi$×1.0 mm in thickness was cut off from each insulator and subjected to measurement of withstand voltage according to the method described in JIS-C2141, with the results shown in Table 2. In this case, those samples whose withstand voltage is not less than 35 kV/mm were exemplified as Examples 7 to 12 and those samples whose withstand voltage was lower than 35 kV/mm were determined to be outside the scope of the invention and exemplified as References X6 to X10.

TABLE 2

| Sample No. | Alumina (wt %) | Sintering aid (wt %) | Withstand voltage (kV/mm) | Evaluation | Sintering aid | Grain boundary phase composition |
|---|---|---|---|---|---|---|
| 1 Reference X6 | 70 | 30 | 27 | Poor | $Y_2O_3/SiO_2 = 0.04/1$ | $Y_2Si_2O_7 + SiO_2$ |
| 2 Reference X7 | 80 | 20 | 31 | Moderate | | |
| 3 Example 7 | 90 | 10 | 36 | Good | | |
| 4 Example 8 | 95 | 5 | 41 | Excellent | | |
| 5 Example 9 | 98 | 2 | 43 | Excellent | | |
| 6 Example 10 | 99 | 1 | 43 | Excellent | | |
| 7 Example 11 | 99.5 | 0.5 | 41 | Excellent | | |
| 8 Example 12 | 99.8 | 0.2 | 37 | Good | | |
| 9 Reference X8 | 99.9 | 0.1 | 33 | Moderate | | |
| 10 Reference X9 | 99.95 | 0.05 | 30 | Moderate | | |
| 11 Reference X10 | 99.98 | 0.02 | 25 | Poor | | |

Further, with respect to sample Nos. 23 to 33, yttria/silica mixed slurries having a mixing ratio between the yttria powder and the silica powder of 0.08:1 were prepared by the first mixing step 1A in a similar way. Next, the alumina powder and the mixed slurry were mixed in the second mixing step P2 while changing the formulation ratio between the alumina powder and the sintering aid powder in the form of the slurry as indicated in Table 3, thereby obtaining yttria/silica/alumina mixed slurries. Each slurry was subsequently subjected to such granulation step P3, molding step P4 and sintering step as set out above to provide an insulator for actual spark plug. A sample having a size of 15 mm$\phi$×1.0 mm in thickness was cut off from each insulator and subjected to measurement of withstand voltage according to the method described in JIS-C2141, with the results shown in Table 3. In this case, those samples whose withstand voltage is not less than 35 kV/mm were exemplified as Examples 13 to 18 and those samples whose withstand voltage was lower than 35 kV/mm were determined to be outside the scope of the invention and exemplified as References X11 to X15.

TABLE 3

| Sample No. | Formulation ratio Alumina (wt %) | Sintering aid (wt %) | Withstand voltage (kV/mm) | Evaluation | Sintering aid | Grain boundary phase composition |
|---|---|---|---|---|---|---|
| 1 Reference X11 | 70 | 30 | 27 | Poor | $Y_2O_3/SiO_2 = 0.08/1$ | $Y_2Si_2O_7 + SiO_2$ |
| 2 Reference X12 | 80 | 20 | 31 | Moderate | | |
| 3 Example 13 | 90 | 10 | 35 | Good | | |
| 4 Example 14 | 95 | 5 | 39 | Good | | |
| 5 Example 15 | 98 | 2 | 41 | Excellent | | |
| 6 Example 16 | 99 | 1 | 41 | Excellent | | |
| 7 Example 17 | 99.5 | 0.5 | 40 | Excellent | | |
| 8 Example 18 | 99.8 | 0.2 | 36 | Good | | |
| 9 Reference X13 | 99.9 | 0.1 | 33 | Moderate | | |
| 10 Reference X14 | 99.95 | 0.05 | 30 | Moderate | | |
| 11 Reference X15 | 99.98 | 0.02 | 25 | Poor | | |

Figure 10A:
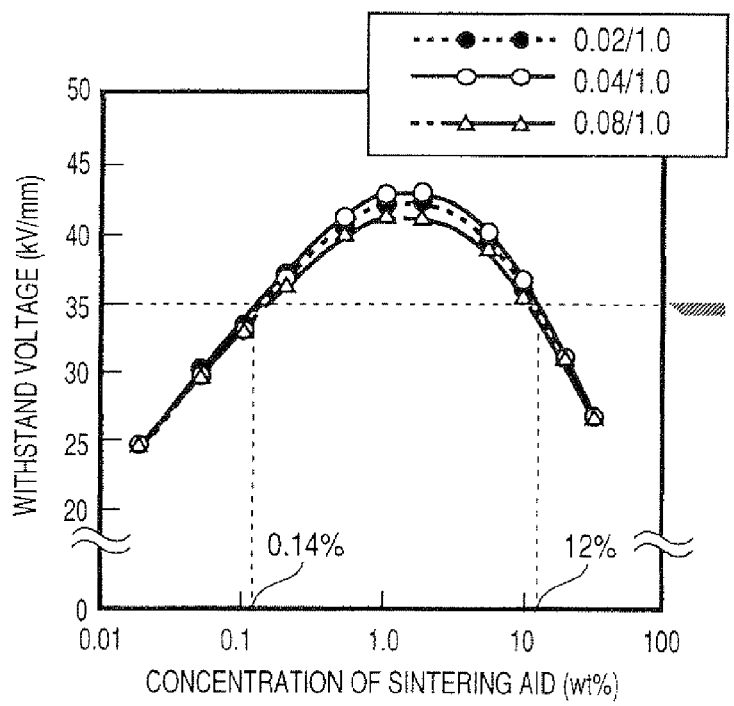
Figure 10B:
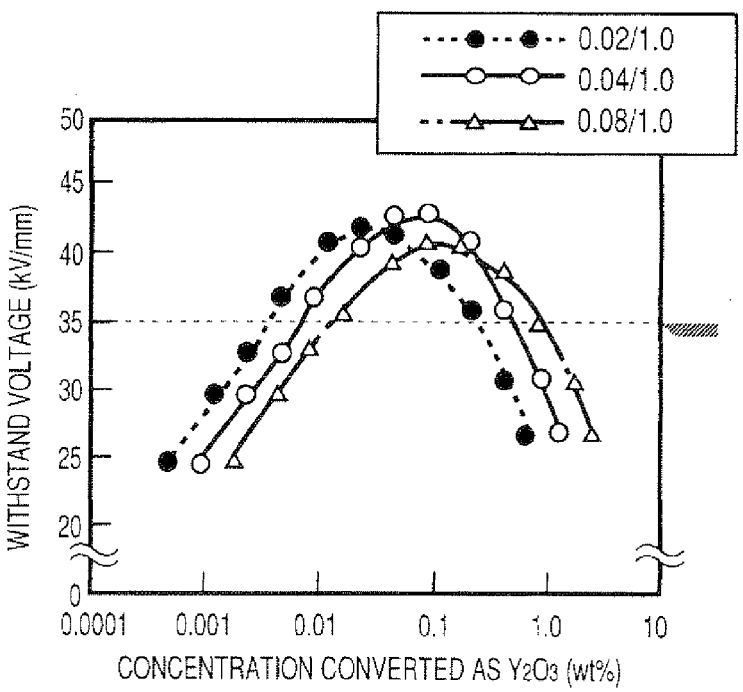

The results shown in the foregoing tables are summarized in graphs of FIGS. 10A and 10B. FIG. 10A shows an effect of the sintering aid concentration (wt %) relative to the withstand voltage and FIG. 10B shows an effect of the concentration of the Y component, converted to $Y_2O_3$, in the crystal grain boundary relative to the withstand voltage.

From FIG. 10A, it will be seen that when the sintering aid consisting of the yttria powder and the silica powder is formulated in the range of from 0.14 wt % to 12 wt % based on the alumina sintered body, the withstand voltage as high as not less than 35 kV/mm can be realized.

Further, when the mixing ratio between the yttria powder and the silica powder is so changed as to be at 0.0.2, 0.04 and 0.08:1, a highest effect is attained when the yttria powder is formulated at 0.2 relative to the unit of the silica powder.

From FIG. 10B wherein the abscissa indicates a concentration converted to $Y_2O_3$, it will be seen that because the effect of the invention differs depending on the ratio of silica formulated relative to the same level of the concentration converted to $Y_2O_3$, the ratio between the silica powder and the yttria powder is important.

Next, the sample Nos. 1 to 11 were each polished into a shape having a dimension of 3 mm×4 mm×40 mm as specified in JIS-R1601 to provide a sample for bending strength testing. Each sample was subjected to a four-point bend test in air at room temperature and 900° C. according to the testing method described in JIS-R1601. The results are shown in Table 4 and also in FIG. 11.

of the references. The total evaluations are just as shown in Table 4, revealing that the samples of the examples are totally assessed as good or excellent.

EXAMPLE 2

An alumina powder having a purity of not less than 99.9% and an average particle size of from 0.4 to 1.0 μm, a silica powder having a $SiO_2$ purity of not less than 99.9% and an average particle size of 0.5 μm, a yttria powder having a $Y_2O_3$ purity of not less than 99.9% and an average particle size of from 60 to 100 nm and a mullite powder having a $Al_6Si_2O_{13}$ purity of not less than 99.9% and an average particle size of from 0.8 μm were provided.

Like the foregoing example, sample Nos. 34 to 44 were made in the following way. The yttria powder, silica powder and mullite powder were formulated at mixing ratios of the silica powder, the yttria powder and the mullite powder of 1.0:0.02:1.0 and mixed according to the first mixing step P1a of FIG. 9 to provide a yttria/silica/mullite mixed slurry. This slurry was subjected to a procedure including the second mixing step P2a, granulation step P3a, molding step P4a and sintering step P5a to obtain an alumina sintered body in the form of an actual spark plug. Each sample was cut off from the sintered body of a given size and subjected to measurement of withstand voltage. The results are shown in Table 5. Those samples whose withstand voltage were not less than 35 kV/mm were exemplified as Examples 19 to 25, and those

TABLE 4

| Sample No. | Formulation ratio Alumina (wt %) | Sintering aid (wt %) | Withstand voltage (kV/mm) | Four-point bending strength Room temperature (MPa) | 900° C. (MPa) | Total evaluation |
|---|---|---|---|---|---|---|
| 1 Reference X1 | 70 | 30 | 27 | 350 | 220 | Poor |
| 2 Reference X2 | 80 | 20 | 31 | 410 | 405 | Moderate |
| 3 Example 1 | 90 | 10 | 36 | 435 | 435 | Good |
| 4 Example 2 | 95 | 5 | 39 | 450 | 450 | Good |
| 5 Example 3 | 98 | 2 | 42 | 450 | 460 | Excellent |
| 6 Example 4 | 99 | 1 | 42 | 450 | 460 | Excellent |
| 7 Example 5 | 99.5 | 0.5 | 41 | 450 | 455 | Excellent |
| 8 Example 6 | 99.8 | 0.2 | 37 | 435 | 435 | Good |
| 9 Reference X3 | 99.9 | 0.1 | 33 | 420 | 415 | Moderate |
| 10 Reference X4 | 99.95 | 0.05 | 30 | 405 | 400 | Moderate |
| 11 Reference X5 | 99.98 | 0.02 | 25 | 320 | 195 | Poor |

Figure 11:
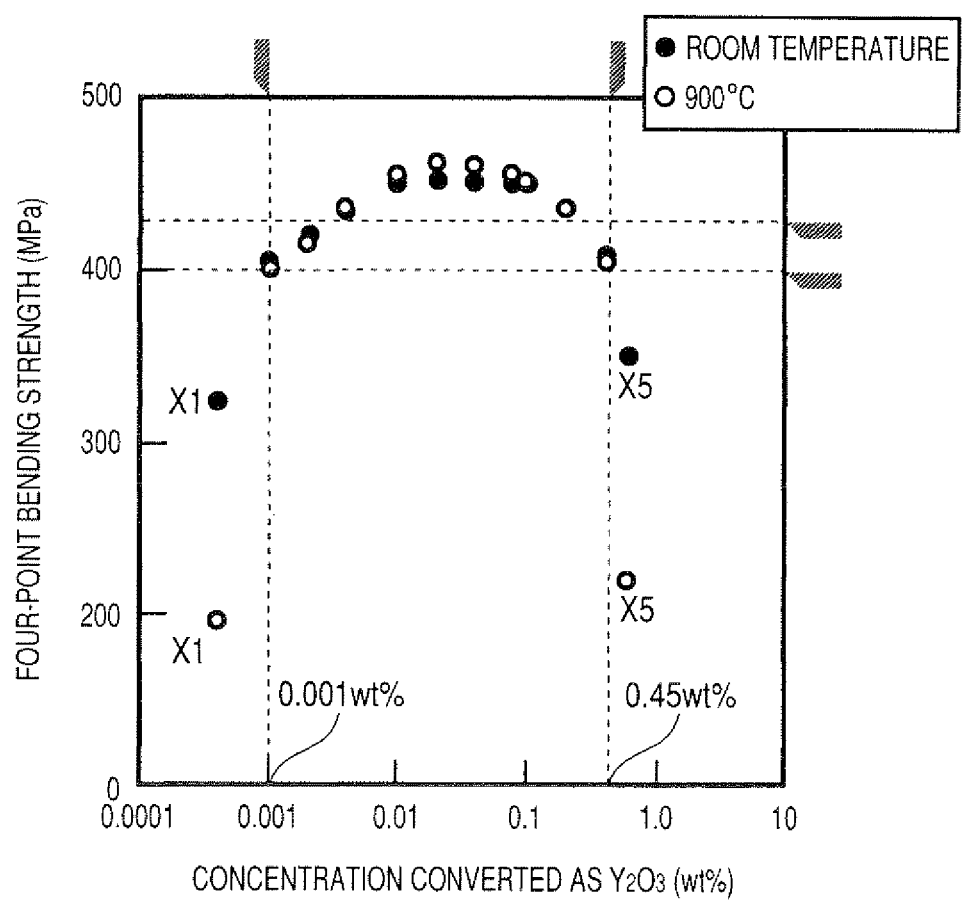
FIG. 11 is a graph showing a four-point bending strength relative to a change in concentration by wt % of Y component in an alumina sintered body converted as $Y_2O_3$.

As will be apparent from Table 4 and FIG. 11, the four-point bending strengths of the examples are better than those samples having a withstand voltage less than 35 kV were exemplified as References X16 to X19.

TABLE 5

| Sample No. | | Formulation ratio | | Withstand voltage (kV/mm) | Evaluation | Sintering aid | Grain boundary phase composition |
|---|---|---|---|---|---|---|---|
| | | Alumina (wt %) | Sintering aid (wt %) | | | | |
| 34 | Reference X16 | 70 | 30 | 27 | Poor | $Y_2O_3/SiO_2/Al_6Si_2O_{13} =$ 0.02/1.0/1/0 | $Y_2Si_2O_7 + SiO_2 +$ $Al_6Si_2O_{13}$ |
| 35 | Reference X17 | 80 | 20 | 32 | Moderate | | |
| 36 | Example 19 | 90 | 10 | 37 | Good | | |
| 37 | Example 20 | 95 | 5 | 40 | Excellent | | |
| 38 | Example 21 | 98 | 2 | 42 | Excellent | | |
| 39 | Example 22 | 99 | 1 | 42 | Excellent | | |
| 40 | Example 23 | 99.5 | 0.5 | 40 | Excellent | | |
| 41 | Example 24 | 99.8 | 0.2 | 37 | Good | | |
| 42 | Example 25 | 99.9 | 0.1 | 35 | Good | | |
| 43 | Reference X18 | 99.95 | 0.05 | 32 | Moderate | | |
| 44 | Reference X19 | 99.98 | 0.02 | 27 | Poor | | |

Likewise, with sample Nos. 45 to 55, the above procedure was repeated except that the yttria powder, silica powder and mullite powder were mixed at mixing ratios of 1.0:0.04:1.0 in the first mixing step P1a of FIG. 9. The results of measurement of withstand voltage are shown in Table 6. In this experiment, those samples having a withstand voltage of not less than 35 kV/mm were exemplified as Examples 26 to 32 and those samples having a withstand voltage of less than 35 kV/mm were exemplified as References X20 to X23.

TABLE 6

| Sample No. | | Formulation ratio | | Withstand voltage (kV/mm) | Evaluation | Sintering aid | Grain boundary phase composition |
|---|---|---|---|---|---|---|---|
| | | Alumina (wt %) | Sintering aid (wt %) | | | | |
| 45 | Reference X20 | 70 | 30 | 28 | Poor | $Y_2O_3/SiO_2/Al_6Si_2O_{13} =$ 0.04/1.0/1/0 | $Y_2Si_2O_7 + SiO_2 +$ $Al_6Si_2O_{13}$ |
| 46 | Reference X21 | 80 | 20 | 33 | Moderate | | |
| 47 | Example 26 | 90 | 10 | 38 | Good | | |
| 48 | Example 27 | 95 | 5 | 41 | Excellent | | |
| 49 | Example 28 | 98 | 2 | 43 | Excellent | | |
| 50 | Example 29 | 99 | 1 | 43 | Excellent | | |
| 51 | Example 30 | 99.5 | 0.5 | 42 | Excellent | | |
| 52 | Example 31 | 99.8 | 0.2 | 39 | Good | | |
| 53 | Example 32 | 99.9 | 0.1 | 35 | Good | | |
| 54 | Reference X22 | 99.95 | 0.05 | 31 | Moderate | | |
| 55 | Reference X23 | 99.98 | 0.02 | 27 | Poor | | |

Furthermore, the above procedure was also repeated for sample Nos. 56 to 66 except that the yttria powder, silica powder and mullite powder were mixed at mixing ratios of 1.0:0.08:1.0 in the first mixing step P1a of FIG. 9, thereby obtaining an alumina sinter body in the form of a spark plug. The results of measurement of withstand voltage are shown in Table 7. In this experiment, those samples having a withstand voltage of not less than 35 kV/mm were exemplified as Examples 33 to 39 and those samples having a withstand voltage of less than 35 kV/mm were exemplified as References X24 to X27.

TABLE 7

| Sample No. | | Formulation ratio | | Withstand voltage (kV/mm) | Evaluation | Sintering aid | Grain boundary phase composition |
|---|---|---|---|---|---|---|---|
| | | Alumina (wt %) | Sintering aid (wt %) | | | | |
| 56 | Reference X24 | 70 | 30 | 28 | Poor | $Y_2O_3/SiO_2/Al_6Si_2O_{13} =$ 0.08/1.0/1/0 | $Y_2Si_2O_7 + SiO_2 +$ $Al_6Si_2O_{13}$ |
| 57 | Reference X25 | 80 | 20 | 33 | Moderate | | |
| 58 | Example 33 | 90 | 10 | 37 | Good | | |
| 59 | Example 34 | 95 | 5 | 40 | Excellent | | |
| 60 | Example 35 | 98 | 2 | 41 | Excellent | | |
| 61 | Example 36 | 99 | 1 | 41 | Excellent | | |
| 62 | Example 37 | 99.5 | 0.5 | 40 | Excellent | | |
| 63 | Example 38 | 99.8 | 0.2 | 37 | Good | | |
| 64 | Example 39 | 99.9 | 0.1 | 35 | Good | | |
| 65 | Reference X26 | 99.95 | 0.05 | 32 | Moderate | | |
| 66 | Reference X27 | 99.98 | 0.02 | 28 | Poor | | |

Figure 12A:
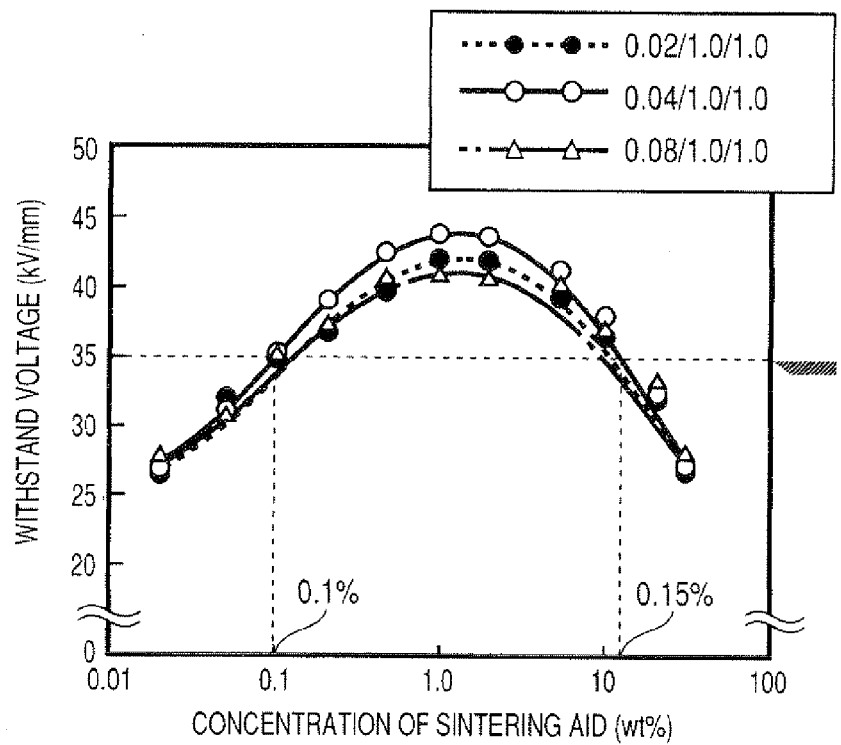
Figure 12B:
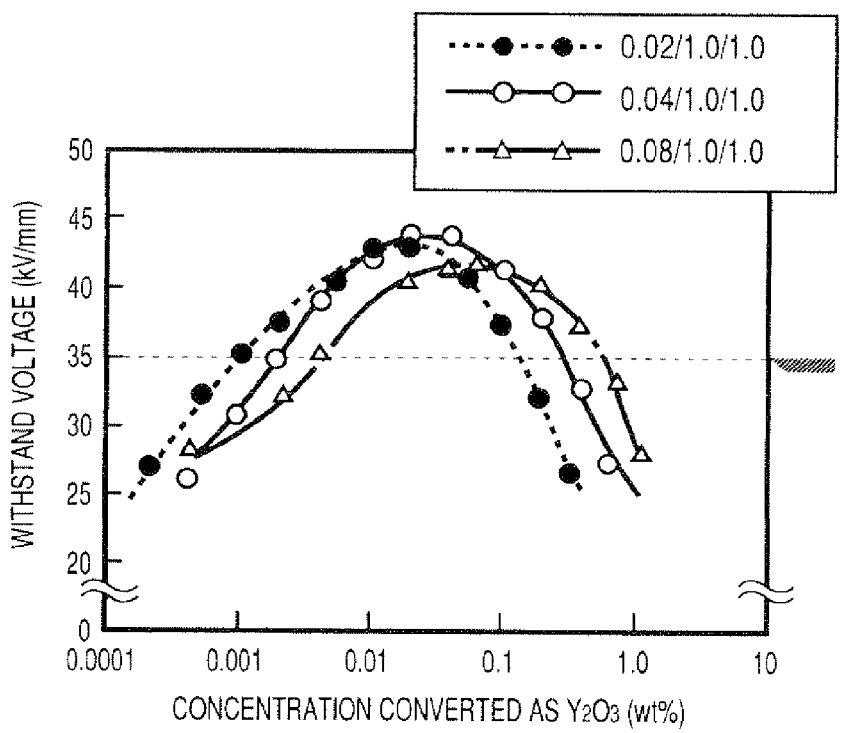

The results of Tables 5 to 7 are summarized in FIGS. 12A and 12B. FIG. 12A shows an effect of the concentration of the sintering aid relative to the withstand voltage according to the preferred embodiment of the invention and FIG. 12B shows an effect of the concentration of Y converted to $Y_2O_3$.

In this embodiment, when the yttria/silica/mullite mixed aid is formulated within a range of from 1 wt % to 15 wt %, it was confirmed that alumina sintered bodies having a withstand voltage as high as not less than 35 kV/mm could be obtained, like the first embodiment.

The fact that the formulation of the yttria powder at a ratio of 0.04 relative to the silica powder is preferred is just as in the case of the first embodiment.

The comparison between the sintered bodies of the first embodiment and those bodies of the preferred embodiment reveals that a higher withstand voltage is attained in a smaller amount of yttria for the alumina sintered bodies of the preferred embodiment using the mullite powder. In the preferred embodiment, a higher withstand voltage is shown over a wider range with respect to the change in concentration of the sintering aid.

Next, the sintered bodies of Examples 21, 28, 35 and References X24, X27 were subjected to the four-point bend test. The results are shown in Table 8. It will be seen that the alumina sintered body of Example 35 making use of the mullite powder exhibits a four-point bending strength as high as not less than 400 MPa at a high temperature of 900° C.

to an engine head (not shown) while covering the insulator 50 about the periphery thereof, and a ground electrode 53 provided along the metal fitting 52.

The metal fitting 52 is made, for example, of a metal material of high heat resistance, such as a conductive low-carbon steel, substantially in the form of a cylinder. The metal fitting 52 is formed, at an outer peripheral surface, with a thread 522 for fixing in a screw hole of the engine head (not shown). In this embodiment, the thread 522 has a nominal diameter of not larger than 10 mm and may be one that is not more than M10 defined in JIS (Japanese Industrial Standards).

The metal fitting 52 is formed, at the middle of an inner peripheral portion thereof, with a stop or locking portion 523 that is made smaller in diameter or tapered toward a tip end side and thus, the insulator 50 is fixedly locked at a larger-sized portion 502 thereof in the inside. At an outer periphery of the metal fitting 52 at the base end side, a nut 523 for fastening the screw 522 is formed. A caulking portion 524 is formed at the base end side of the metal fitting 52 to fixedly caulk the larger-sized portion 502 of the insulator 50 through a seal member 525. The screw 522 is threadedly engaged into a hole formed in the engine head (not shown) through a gasket 55. The inner side thereof of the metal fitting 52 formed with the screw portion 522 constitutes a side face electrode 520 forming an electric field in association with the central electrode 51.

TABLE 8

| | | Formulation ratio | | Withstand | Four-point bending strength | | | | |
|---|---|---|---|---|---|---|---|---|---|
| | | | | | Room | | | | |
| | | Alumina | Sintering aid | voltage | temperature | 900° C. | | | Grain boundary |
| Sample No. | | (wt %) | (wt %) | (kV/mm) | (MPa) | (MPa) | Evaluation | Sintering aid | phase composition |
| 1 | Reference X24 | 70 | 30 | 28 | 350 | 220 | Poor | $Y_2O_3/SiO_2/Al_6Si_2O_{13} =$ | $Y_2Si_2O_7 + SiO_2 +$ |
| 38 | Example 21 | 98 | 2 | 42 | 450 | 462 | Excellent | 0.02 to | $Al_6Si_2O_{13}$ |
| 49 | Example 28 | 98 | 2 | 43 | 450 | 460 | Excellent | 0.08/1.0/1.0 | |
| 60 | Example 35 | 98 | 2 | 41 | 450 | 455 | Excellent | | |
| 11 | Reference X27 | 99.98 | 0.02 | 28 | 320 | 195 | Poor | | |

EXAMPLE 3

Figure 13:
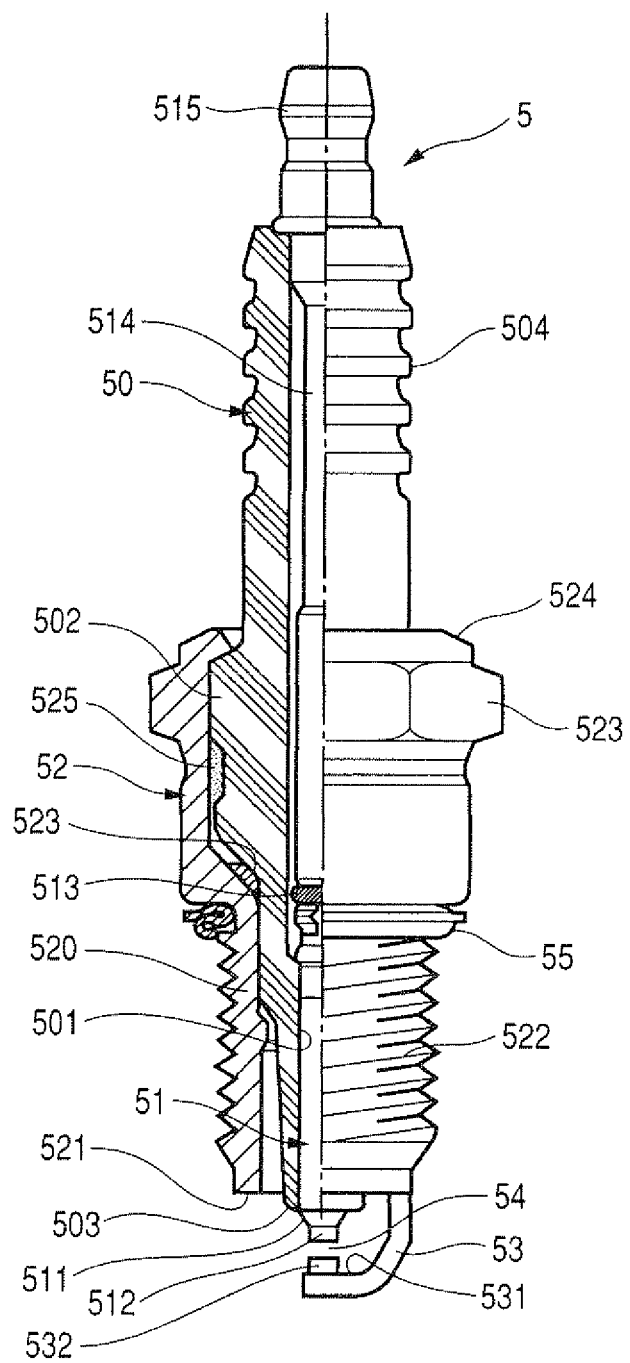
FIG. 13 is a schematic view, partially in section, of an entire structure of a spark plug using, an insulator, an alumina sintered body of the invention.

Referring now to FIG. 13, a spark plug 5 according to a third embodiment of the invention, which make use of the alumina sintered body of the invention, is generally illustrated.

The spark plug 5 in the figure is one that is employed for ignition of combustion engines such as automobile engines and is designed to be fixedly inserted into a screw hole disposed at an engine head (not shown) partitioning a combustion chamber of the combustion engine. When the alumina sintered body of the invention having a high withstand voltage and high strength is used, the spark plug 5 of this embodiment enables an insulator to be thinned and is thus suitable for use as a spark plug of a small diameter. This type of spark plug also enables a plug-mounting space to be miniaturized, which is demanded in association with high-powered combustion engines employed as a recent automobile engine and larger-sized inlet and exhaust valves. It will be noted that as viewed in FIG. 13, the upper side is referred to as a base side and the lower side is as a tip end side or combustion chamber side.

The spark plug 5 in the figure is constituted of an insulator 50 shaped substantially in a cylindrical form and making use of an alumina sintered body of the invention, a central electrode held interiorly of the insulator 50, a metal fitting 52 fixed The insulator 50 is made of an alumina sintered body of the invention and formed substantially in a cylindrical form. The central electrode 51 substantially in an elongated shape is inserted into and fixed in a shaft hole 501 of the insulator 50. A larger-sized portion 502 is formed at the middle of the insulator 50 and is stopped and fixed at the inner side of the metal fitting 52. The insulator 50 has a tip end portion 503 projecting from a tip end portion 521 of the metal fitting 52, so that if such a plug of a small diameter as in this embodiment is used, discharge between the tip end portion 511 of the central electrode 51 and the tip end portion of the metal fitting 52 is avoided.

The insulator 52 is provided, at the base end side, with an insulator head 524 exposed from a caulked portion 523 of the metal fitting. The head 504 elongates a surface distance between a central electrode terminal 515 shaped as corrugated and the metal fitting 52 thereby preventing the creeping leak from occurring.

The central electrode 51 includes an inner electrode material made, for example, of a metal having excellent thermal conductivity, such as Cu, and an outer electrode material made, for example, of a metal material having excellent thermal and corrosion resistances, such as a Ni-based alloy. This electrode 51 is formed as elongated. The central electrode 51 is provided with a central electrode discharge chip 512 of good thermal resistance at the tip portion 511 of the central electrode 51 in such a way as to project from the tip portion 511 toward the combustion chamber side. At the base end side of the central electrode 51, an elongate step 514 that is electrically connected through a conductive glass seal 513 to the central electrode 51 is provided inside the shaft hole 501 of the insulator 50. At the base end side, there is formed a central electrode terminal 515 that is exposed from the insulator head 504 and is connected to an outside ignition device (not shown).

A ground electrode 53 is formed in association with the tip portion 511 of the metal fitting 51. The ground electrode 53 is formed, for example, of a Ni-based alloy composed mainly of Ni substantially in the form of a column. In this embodiment, the ground electrode 53 has a section substantially in the form of a square column and is fixed by welding to the tip portion 511 of the metal fitting at the base end side thereof. The ground electrode 53 is bent substantially in an L form at an intermediate thereof and is in face-to-face relation with the tip portion 511 of the central electrode 51 at a side face 531 of the other end side thereof. At the side face 531 of the ground electrode 53, there is provided a ground electrode discharge chip 532, which is facing through a spark discharge gap 54 to the central electrode discharge chip 512 provided at the tip portion 511 of the central electrode 51 and projects toward the base end side. This spark discharge gap 54 can be designed to have a size, for example, of about 1 mm.

It will be noted that the central electrode discharge chip 512 and the ground electrode discharge chip 532 are, respectively, made, for example, of an iridium alloy or a Pt (platinum) alloy and bonded to the tip portion 511 and side face 531 through laser welding, resistance welding or the like.

As having stated hereinbefore, the insulator 50 makes use of an alumina sintered body of the invention. This sintered body comprises alumina crystal having an average size of not larger than 2 μm as a main phase and a high melting phase made of crystalline $Y_2Si_2O_7$ and amorphous $SiO_2$ or a high melting crystalline phase made of crystalline $Y_2Si_2O_7$ and amorphous $SiO_2$ and $Al_6Si_2O_{13}$ in crystal grain boundaries, each within a range of from 0.1 wt % to 15 wt %.

As illustrated in the above embodiment, after formation of an actual insulator 50 by use of the alumina sintered body of the invention, pores has been rarely observed in the samples cut off from the sintered bodies for measurement of withstand voltage. In addition, the sintered body has a withstand voltage as high as not less than 35 kV/mm and also has a deflecting strength as high as not smaller than 400 MPa at a high temperature of 900° C.

When the spark plug 5 has been subjected to an endurance test using a real engine under conditions of a discharge voltage of 35 kV and a high load (at full throttle on average of 5,500 r.p.m.) over 200 hours, no penetrating discharge has been observed.

Accordingly, the spark plug of the invention is dense and defect-free and has both a high withstand voltage and high deflecting strength, thus being very reliable.

When a high voltage is applied between the central electrode 51 and the side face electrode 53 of the spark plug 5, penetrating discharge may occur between the central electrode 51 and the side face electrode 53 in case where the withstand voltage of the insulator is low. Nevertheless, the insulator made of the alumina sintered body of the invention has an excellent withstand voltage characteristic with no concern that penetrating discharge occurs if the insulator is formed as thin.

As will be apparent from the foregoing, the alumina sintered body of the invention has a high insulation quality and high withstand voltage characteristic and is effective for use as an insulating material when applied to as spark plugs, engine parts and IC boards of combustion engines of automobiles. Thus, the sintered body is enough to satisfy a recent demand for miniaturization of spark plugs thereby contributing to an improvement of reliability therefor.

What is claimed is:

1. An alumina sintered body which comprises alumina crystals as a main phase and a grain boundary phase containing at least a yttrium component in grain boundaries of the alumina crystals, wherein said alumina crystals have an average crystal size of not larger than 2 μm, said grain boundary phase has a high melting phase comprised of $Y_2Si_2O_7$ as said yttrium component and $SiO_2$, and when the alumina sintered body is taken as 100 wt %, said high melting phase is present in the range of from 0.1 wt % to 15 wt %.

2. The alumina sintered body according to claim 1, wherein said crystal grain boundaries further comprise a mullite phase of $Al_6Si_2O_{13}$.

3. The alumina sintered body according to claim 1 wherein a content of Y, converted as $Y_2O_3$, existing in said crystal grain boundaries is in the range of 0.02 wt % to 0.08 wt % relative to unit weight of S, converted as $SiO_2$, existing in said crystal grain boundaries.

4. A spark plug mounted in an combustion engine for ignition of the combustion engine, which comprises a metal fitting having a screw thread at an outer periphery thereof, an insulator fixed inside said metal fitting, a central electrode fixed in the insulator so as to permit a tip end thereof to project from said insulator, and a ground electrode fixed to said metal fitting and being in face-to-face relation with the tip end of said central electrode through a spark gap, wherein said insulator is made of the alumina sintered body defined in claim 1.

* * * * *

UNITED STATES PATENT AND TRADEMARK OFFICE
CERTIFICATE OF CORRECTION

PATENT NO. : 8,431,505 B2
APPLICATION NO. : 12/722175
DATED : April 30, 2013
INVENTOR(S) : Ogata et al.

Page 1 of 1

It is certified that error appears in the above-identified patent and that said Letters Patent is hereby corrected as shown below:

In the Claims

In claim 3, line 4 (column 20, line 40), "S" should be --Si--

Signed and Sealed this
Sixteenth Day of July, 2013

Teresa Stanek Rea
*Acting Director of the United States Patent and Trademark Office*